United States Patent
Liu et al.

(10) Patent No.: US 8,248,682 B2
(45) Date of Patent: Aug. 21, 2012

(54) THERMAL-CHROMATIC ELEMENT AND THERMAL-CHROMATIC DISPLAY DEVICE USING THE SAME

(75) Inventors: Peng Liu, Beijing (CN); Duan-Liang Zhou, Beijing (CN); Shou-Shan Fan, Beijing (CN)

(73) Assignees: Tsinghua University, Beijing (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 43 days.

(21) Appl. No.: 12/822,235

(22) Filed: Jun. 24, 2010

(65) Prior Publication Data
US 2011/0157674 A1   Jun. 30, 2011

(30) Foreign Application Priority Data
Dec. 31, 2009 (CN) .......................... 2009 1 0239664

(51) Int. Cl.
*G02F 1/01* (2006.01)

(52) U.S. Cl. ....................................................... 359/288

(58) Field of Classification Search .................... 359/288
See application file for complete search history.

(56) References Cited

U.S. PATENT DOCUMENTS

| | | | |
|---|---|---|---|
| 6,287,485 B1 * | 9/2001 | Akashi et al. | 252/583 |
| 7,933,058 B2 * | 4/2011 | Liu et al. | 359/288 |

* cited by examiner

*Primary Examiner* — James Jones
(74) *Attorney, Agent, or Firm* — Altis Law Group, Inc.

(57) ABSTRACT

A thermal-chromatic element includes a sealed enclosure, an isolation layer, a first heating element, a thermal-chromatic material layer, a second heating element and an absorption material layer. The isolation layer is disposed in the sealed enclosure and separates the sealed enclosure into a first chamber and a second chamber. The first heating element is configured to heat thermal-chromatic material layer in the first chamber. The thermal-chromatic material layer is disposed in the first chamber. The thermal-chromatic material layer is able to change color by releasing and absorbing water. The second heating element is configured to heat absorption material layer in the second chamber. The absorption material layer is disposed in the second chamber.

20 Claims, 10 Drawing Sheets

THERMAL-CHROMATIC ELEMENT AND THERMAL-CHROMATIC DISPLAY DEVICE USING THE SAME

RELATED APPLICATIONS

This application claims all benefits accruing under 35 U.S.C. §119 from China Patent Application No. 200910239664.2, filed on Dec. 31, 2009 in the China Intellectual Property Office, the disclosure of which is incorporated herein by reference. The application is also related to copending application Ser. No. 12/822,236 entitled, "THERMOCHROMATIC ELEMEN AND THERMOCHROMATIC DISPLAY DEVICE USING THE SAME", filed Jun. 24, 2010.

BACKGROUND

1. Technical Field

The present disclosure generally relates to a thermal-chromatic device and a thermal-chromatic display apparatus incorporating carbon nanotubes.

2. Description of Related Art

E-paper is a kind of display technology without back light module. At present, E-paper technology is mainly based on electrophoresis, wherein electric particles are used. The movement of the electric particles allows different images to be formed in the display. However, e-paper is still restricted to black and white images and cannot show color images.

What is needed, therefore, is a display device without back light module that can overcome the above-described shortcomings.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
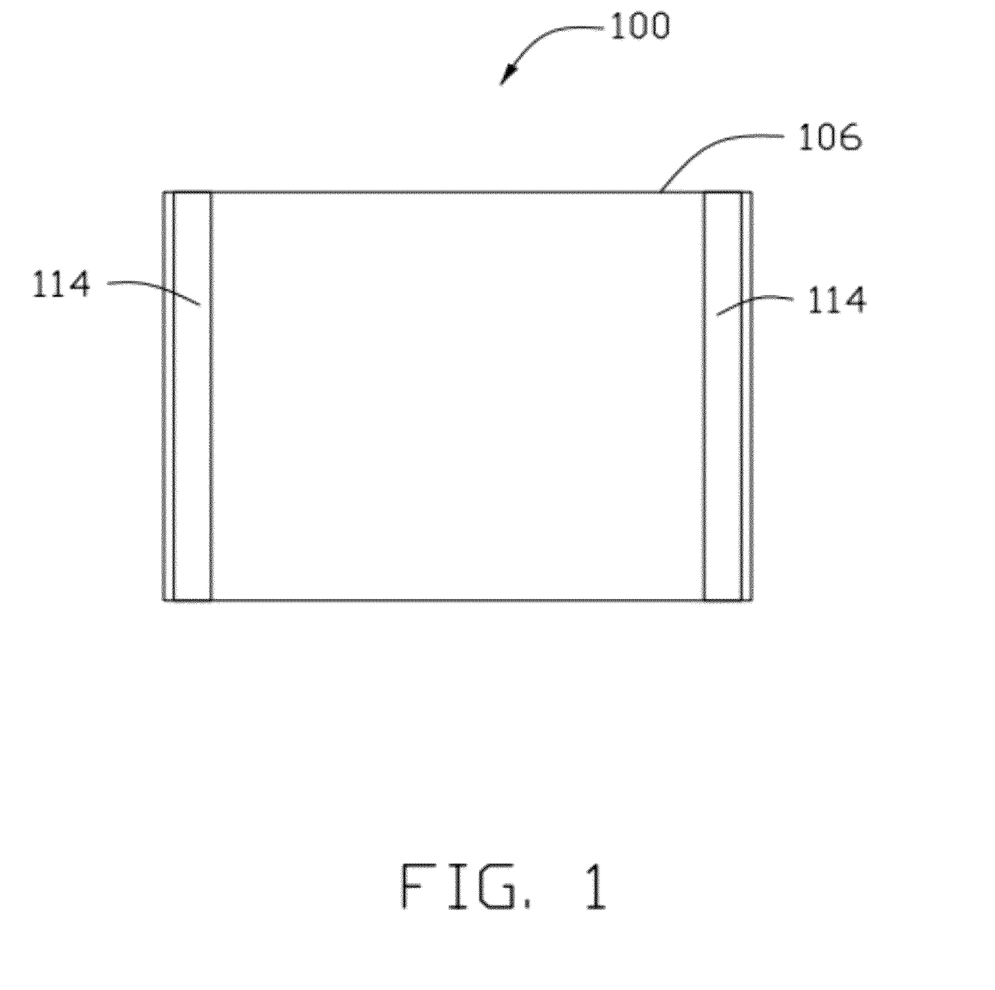
FIG. 1 is a schematic top plan view of one embodiment of a thermal-chromatic element.
Figure 2:
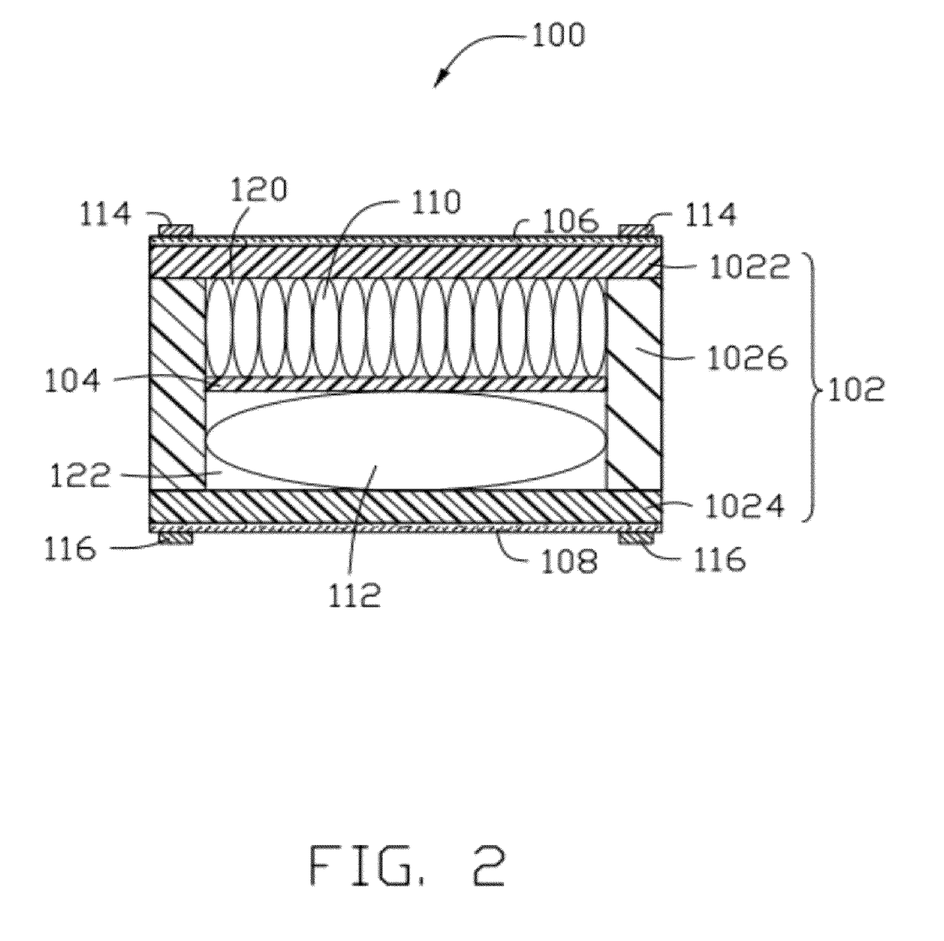
FIG. 2 is a cross-sectional side view of the thermal-chromatic element in FIG. 1.

Referring to FIGS. 1 and 2, a thermal-chromatic element 100 of one embodiment is shown. The thermal-chromatic element 100 includes a sealed enclosure 102; an isolation layer 104, a first heating element 106, a second heating element 108, a thermal-chromatic material layer 110 and an absorption material layer 112. The thermal-chromatic element 100 further includes at least two first electrodes 114 and at least two second electrodes 116. The isolation layer 104 is disposed in the sealed enclosure 102 and divides the sealed enclosure 102 into two separate chambers, namely a first chamber 120 and a second chamber 122. The first heating element 106 is configured to heat the first chamber 120, and the second heating element 108 is configured to heat the second chamber 122. The at least two first electrodes 114 are electrically connected with the first heating element 106. The at least two second electrodes 116 are electrically connected with the second heating element 108. The thermal-chromatic material layer 110 is disposed in the first chamber 120. The absorption material layer 112 is disposed in the second chamber 122.

A shape of the sealed enclosure 102 can be cube, cuboid or cylinder. In one embodiment according to FIG. 2, the sealed enclosure 102 of the thermal-chromatic element 100 has a cube structure. The sealed enclosure 102 includes an upper sheet 1022, a lower sheet 1024, and four side sheets 1026. The four side sheets 1026 are disposed between the upper sheet 1022 and the lower sheet 1024 to form the cubic sealed enclosure 102. The upper sheet 1022 is insulated and transparent. A material of the upper sheet 1022 can be glass or transparent polymer. The transparent polymer includes polyethylene terephthalate, polyimide, polystyrene, polypropylene, polyethylene, polychloroprene, and PVC. The lower sheet 1024 and the side sheets 1026 are made of insulated materials, such as ceramic, resin, or plastic.

The isolation layer 104 is suspended in the sealed enclosure 102. Shape of the isolation layer 104 is not limited, can be round, square or triangular. The ridge of the isolation layer 104 can be fixed on the side sheets 1026 via adhesive or mechanical method. The around ridge of the isolation layer 104 can also be embedded in the side sheets 1026. The isolation layer 104 is substantially parallel with the upper sheet 1022 and/or the lower sheet 1024. According to one embodiment as shown in FIG. 2, the isolation layer 104 is square and substantially parallel with the upper sheet 1022 and the lower sheet 1024. The isolation layer 104 is fixed on the side sheets 1026 via adhesive. The isolation layer 104 includes a plurality of micropores for the passage of gas from the first chamber 120 to the second chamber 122. The isolation layer 104 can be a semipermeable membrane, such as cell wall film, bladder film, or parchment. The isolation layer 104 can be porous substrate with other materials deposited in the pores, such as unglazed ceramic with copper hexacyanoferrate deposited in the pores. The isolation layer 104 is configured to separate the first chamber 120 and the second chamber 122. A thickness of the isolation layer 104 can be in a range from about 1 micrometer to about 1 millimeter. In one embodiment, the isolation layer 104 is a parchment with the thickness 100 micrometers.

The size and the shape of the first chamber 120 and the second chamber 122 can be same or different. The size and the shape are determined by the distance between the upper sheet 1022 and the isolation layer 104 and the distance between the four side sheets 1026. In one embodiment, shown in FIG. 2, the first chamber 120 and the second chamber 122 have the same dimensions.

The thermal-chromatic material layer 110 will release gas when it reaches a first temperature. A material of the thermal-chromatic material layer 110 can be salt of copper, cobalt or nickel with crystal water, such as $CuSO_4.5H_2O$, $NiCl_2.C_6H_{12}N_4.H_2O$, $CoCl_2.2C_6H_{12}N_4.10H_2O$, $CoBr_2.2C_6H_{12}N_4.10H_2O$, $CoI_2.2C_6H_{12}N_4.10H_2O$, $CuSO_4.C_6H_{12}N_4.9H_2O$, $CuSO_4.2C_6H_{12}N_4.5H_2O$, $NiBr_2.2C_6Hl_2N_4.10H_2O$, $NiCl_2.2C_6H_{12}N_4.10H_2O$ and $Co(No_3)_2.2C_6H_{12}N_4.10H_2O$. The thermal-chromatic material layer 110 is filled in the first chamber 120 and is colorful at room temperature. When the thermal-chromatic material layer 110 is heated to a temperature higher than the first temperature, the crystal water will be released as vapor and the color of thermal-chromatic material layer 110 will be changed.

A material of the absorption layer 112 is bibulous, can be acrylic ester polymer, polyvinyl alcohol, vinyl acetate copolymer, polyurethane, or polyethylene oxide. The absorption layer 112 can be sponge or active carbon. The absorption layer 112 is filled in the second chamber 122 and can absorb water vapor from the first chamber 120.

The first heating element 106 is disposed on a surface of the upper sheet 1022 and configured to heat the first chamber 120. The upper sheet 1022 includes a first upper surface and a first lower surface opposite the upper surface. The first lower surface is disposed in the first chamber 120. The first heating element 106 can be disposed on the first upper surface or the first lower surface of the upper sheet 1022. The first heating element 106 should be transparent and can be an ITO film or a carbon nanotube layer structure.

The second heating element 108 is disposed on a surface of the lower sheet 1024 and configured to heat the second chamber 122. The lower sheet 1024 includes a second upper surface and a second lower surface opposite the second upper surface. The second upper surface is disposed in the second chamber 122. The second heating element 108 can be disposed in the second upper surface or the second lower surface. The second heating element 108 can be a metal film, an ITO film or a carbon nanotube layer structure. In the present embodiment according to FIGS. 1 and 2, the first heating element 106 is disposed on the first upper surface of the upper sheet 1022, the second heating element 108 is disposed on the second lower surface of the lower sheet 1024.

The carbon nanotube layer structure includes a plurality of carbon nanotubes joined by van der Waals attractive force therebetween. The carbon nanotube layer structure can be a substantially pure structure of the carbon nanotubes, with few impurities. The carbon nanotubes can be used to form many different structures and provide a large specific surface area. The carbon nanotube layer structure can be a free standing structure, that is, the carbon nanotube layer structure can be supported by itself without a substrate. When at least one point of the carbon nanotube layer structure is held, the entire carbon nanotube layer structure can be lifted without being destroyed. The heat capacity per unit area of the carbon nanotube layer structure can be less than $2\times10^{-4}$ $J/m^2*K$. In one embodiment, the heat capacity per unit area of the carbon nanotube layer structure is less than or equal to $1.7\times10^{-6}$ $J/m^2*K$. Because the heat capacity of the carbon nanotube layer structure is very low, the temperature of the first heating element 106 or the second heating element 108 can rise and fall quickly, and has a high response heating speed. Thus, the first heating element 106 or the second heating element 108 has a high heating efficiency and accuracy. In addition, because the carbon nanotube layer structure can be substantially pure, the carbon nanotubes are not easily oxidized and the lifespan of the first heating element 106 and/or the second heating element 108 will be relatively long. Furthermore, because the carbon nanotubes have a low density, about 1.35 $g/cm^3$, thus the first heating element 106 or the second heating element 108 is light. As the heat capacity of the carbon nanotube layer structure is very low, the first heating element 106 or the second heating element 108 using the carbon nanotube layer structure rises temperature quickly, and the thermal-chromatic element 100 respond quickly. Because the carbon nanotube has a large specific surface area, the carbon nanotube layer structure with a plurality of carbon nanotubes has a larger specific surface area. If the specific surface of the carbon nanotube layer structure is large enough, the carbon nanotube layer structure is adhesive and can be directly applied to a surface.

The carbon nanotubes in the carbon nanotube layer structure can be orderly or disorderly arranged. The term 'disordered carbon nanotube layer structure' refers to a structure where the carbon nanotubes are arranged along different directions, and the aligning directions of the carbon nanotubes are random. The number of the carbon nanotubes arranged along each different direction can be almost the same (e.g. uniformly disordered). The disordered carbon nanotube layer structure can be isotropic, namely the carbon nanotube layer structure has properties identical in all directions of the carbon nanotube layer structure. The carbon nanotubes in the disordered carbon nanotube layer structure can be entangled with each other.

The carbon nanotube layer structure including ordered carbon nanotubes is an ordered carbon nanotube layer structure. The term 'ordered carbon nanotube layer structure' refers to a structure where the carbon nanotubes are arranged in a consistently systematic manner, e.g., the carbon nanotubes are arranged approximately along a same direction and/or have two or more sections within each of which the carbon nanotubes are arranged approximately along a same direction (different sections can have different directions). The carbon nanotubes in the carbon nanotube layer structure 164 can be selected from single-walled, double-walled, and/or multi-walled carbon nanotubes.

The carbon nanotube layer structure can be a film structure with a thickness ranging from about 0.5 nanometers (nm) to about 1 mm. The carbon nanotube layer structure can include at least one carbon nanotube film.

Figure 3:
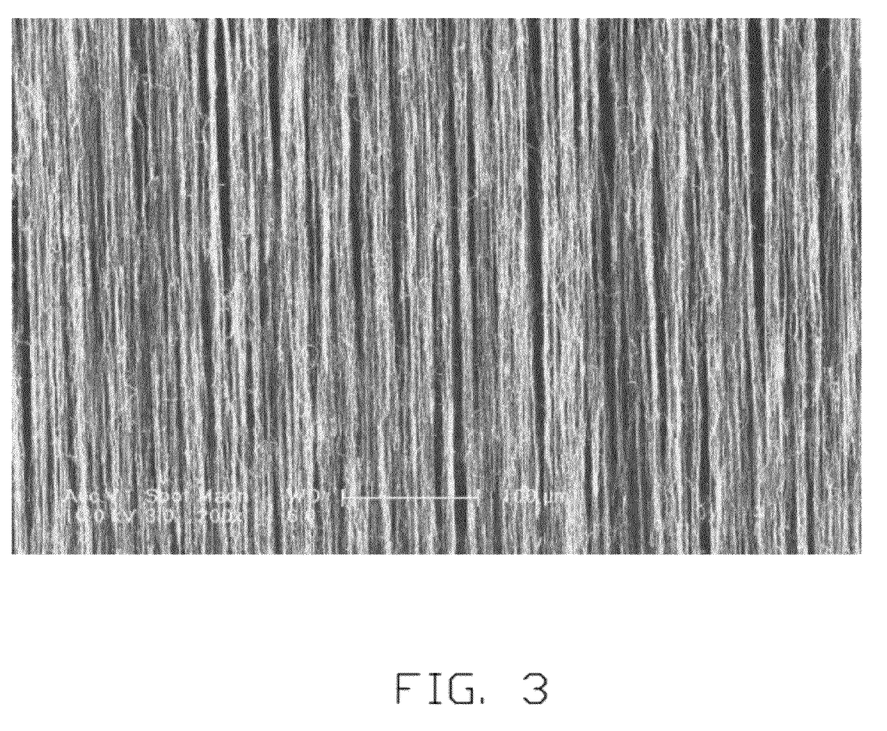
FIG. 3 is a Scanning Electron Microscope (SEM) image of a drawn carbon nanotube film.

In one embodiment, the carbon nanotube film is a drawn carbon nanotube film. A film can be drawn from a carbon nanotube array, to obtain a drawn carbon nanotube film. Overall, the drawn carbon nanotube film includes a plurality of successive and oriented carbon nanotubes joined end-to-end by van der Waals attractive force therebetween. The drawn carbon nanotube film is a free-standing film. Each drawn carbon nanotube film includes a plurality of successively oriented carbon nanotube segments joined end-to-end by van der Waals attractive force therebetween. Each carbon nanotube segment includes a plurality of carbon nanotubes substantially parallel to each other, and joined by van der Waals attractive force therebetween. Referring to FIG. 3, some variations can occur in the drawn carbon nanotube film. The carbon nanotubes in the drawn carbon nanotube film are oriented along a preferred orientation. The carbon nanotube film can be treated with an organic solvent to increase the mechanical strength and toughness of the carbon nanotube film and reduce the coefficient of friction of the carbon nanotube film. The thickness of the carbon nanotube film can range from about 0.5 nm to about 100 μm.

The carbon nanotube layer structure can include at least two stacked carbon nanotube films. In other embodiments, the carbon nanotube layer structure can include two or more coplanar carbon nanotube films, and can include layers of coplanar carbon nanotube films. Additionally, when the carbon nanotubes in the carbon nanotube film are aligned along one preferred orientation (e.g., the drawn carbon nanotube film) an angle can exist between the orientations of carbon nanotubes in adjacent films, whether stacked or adjacent. Adjacent carbon nanotube films can be joined by only the van der Waals attractive force therebetween. The number of the layers of the carbon nanotube films is not limited. However, the thicker the carbon nanotube layer structure, the specific surface area will decrease. An angle between the aligned directions of the carbon nanotubes in two adjacent carbon nanotube films can range from about 0 degrees to about 90 degrees. When the angle between the aligned directions of the carbon nanotubes in adjacent carbon nanotube films is larger than 0 degrees, the carbon nanotubes in the carbon nanotube layer structure define a microporous structure. The carbon nanotube layer structure in an embodiment employing these films will have a plurality of micropores. Stacking the carbon nanotube films will also add to the structural integrity of the carbon nanotube layer structure.

Figure 4:
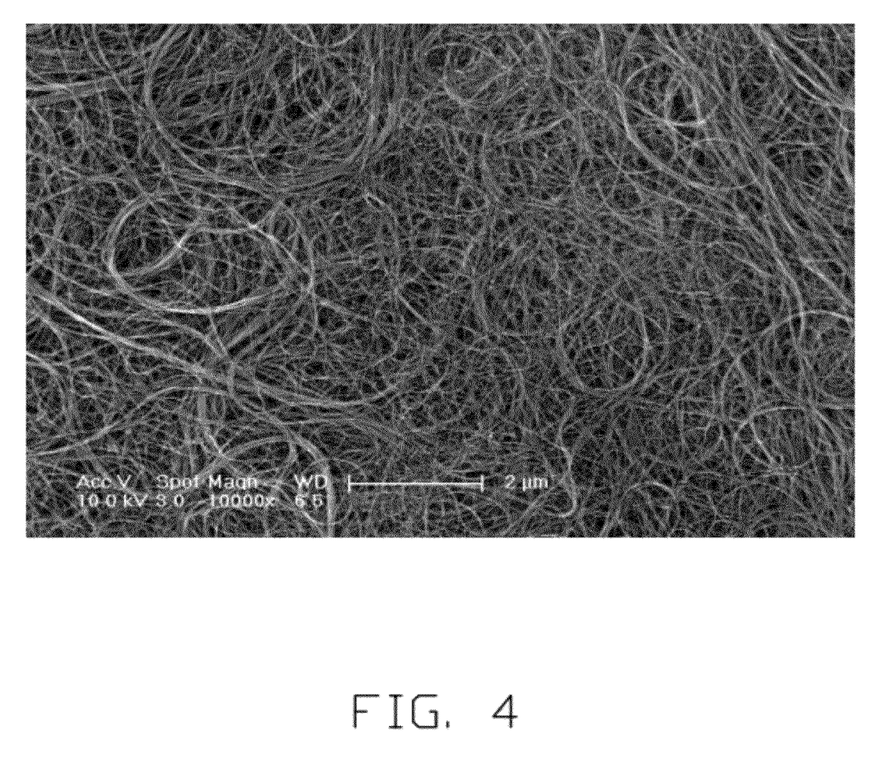
FIG. 4 is an SEM image of a flocculated carbon nanotube film.

In other embodiments, the carbon nanotube film can be a flocculated carbon nanotube film. Referring to FIG. 4, the flocculated carbon nanotube film can include a plurality of long, curved, disordered carbon nanotubes entangled with each other. Furthermore, the flocculated carbon nanotube film can be isotropic. The carbon nanotubes can be substantially uniformly dispersed in the carbon nanotube film. Adjacent carbon nanotubes are acted upon by van der Waals attractive force to obtain an entangled structure with micropores defined therein. It is noteworthy that the flocculated carbon nanotube film is very porous. Sizes of the micropores can be less than 10 μm. The porous nature of the flocculated carbon nanotube film will increase the specific surface area of the carbon nanotube layer structure. Further, due to the carbon nanotubes in the carbon nanotube layer structure being entangled with each other, the carbon nanotube layer structure employing the flocculated carbon nanotube film has excellent durability, and can be fashioned into desired shapes with a low risk to the integrity of the carbon nanotube layer structure. The thickness of the flocculated carbon nanotube film can range from about 0.5 nm to about 1 mm.

Figure 5:
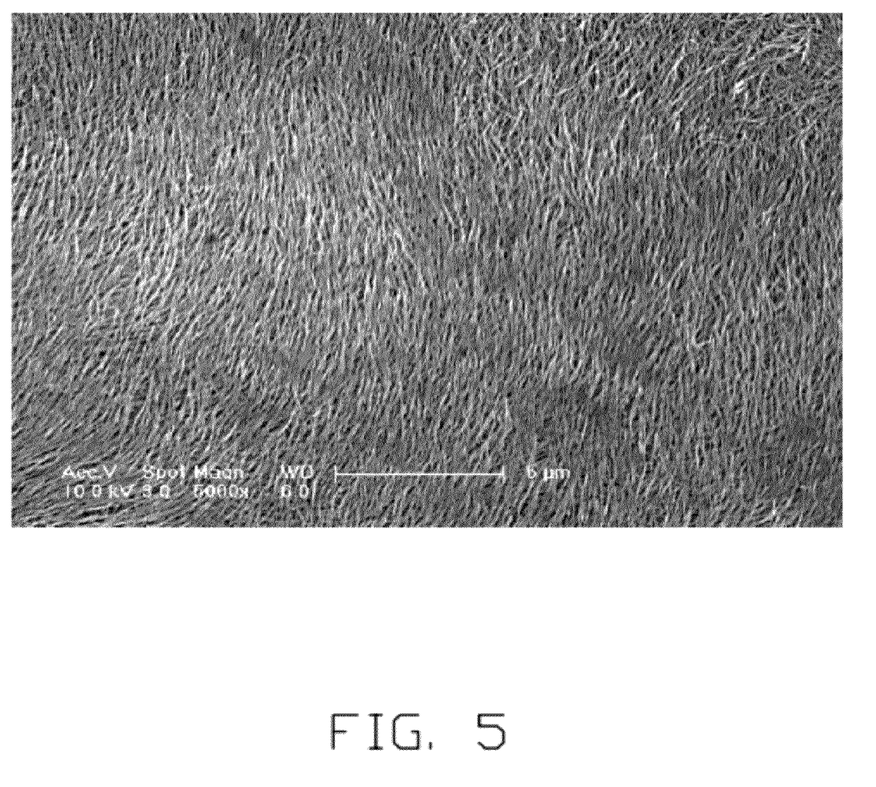
FIG. 5 is an SEM image of a pressed carbon nanotube film.

In other embodiments, the carbon nanotube film can be a pressed carbon nanotube film. Referring to FIG. 5, the carbon nanotubes in the pressed carbon nanotube film are arranged along a same direction or along different directions. The carbon nanotubes in the pressed carbon nanotube film can rest upon each other. Adjacent carbon nanotubes are attracted to each other and are joined by van der Waals attractive force. An angle between a primary alignment direction of the carbon nanotubes and a surface of the pressed carbon nanotube film is about 0 degrees to about 15 degrees. The greater the pressure applied, the smaller the angle obtained. When the carbon nanotubes in the pressed carbon nanotube film are arranged along different directions, the carbon nanotube layer structure can be isotropic. Here, "isotropic" means the carbon nanotube film has properties identical in all directions substantially parallel to a surface of the carbon nanotube film. The thickness of the pressed carbon nanotube film ranges from about 0.5 nm to about 1 mm.

The at least two first electrodes 114 are used to electrically connect the first heating element 106 and the output circuit and make the first heating element 106 produce Joule heat. The at least two first electrodes 114 can be fixed on the surface of the first heating element 106 by conductive adhesive (not shown). The at least two first electrodes 114 are made of conductive material. The shapes of the at least two first electrodes 114 are not limited and can be lamellar-shaped, rod-shaped, wire-shaped, or block-shaped. The cross sectional shape of the two first electrodes 114 can be round, square, trapezium, triangular, or polygonal. The thickness of the two first electrodes 114 can be any size, depending on the design, and can be about 1 micrometer to about 1 centimeter. In the present embodiment as shown in FIGS. 1 and 2, the two first electrodes 114 both have a linear shape, and are disposed on the surface of the first heating element 106. The two first electrodes 114 are substantially parallel with each other. In one embodiment, when the first heating element 106 includes the carbon nanotube layer structure having a plurality of carbon nanotubes arranged in a same direction, the axes of the carbon nanotubes can be substantially perpendicular to the two first electrodes 114. Further, the two first electrodes 114 can be electrically connected with the output circuit via two electrodes wires (not shown).

The at least two second electrodes 116 are used to electrically connect the second heating element 108 and the output circuit and make the second heating element 108 produce Joule heat. The at least two second electrodes 116 can be fixed on the surface of the second heating element 108 by conductive adhesive (not shown). The material and the shape of the second electrodes 116 can be the same as the first electrodes 114. The relationship between the second electrodes 116 and the second heating element 108 can be the same as the relationship between the first electrodes 114 and the first heating element 106. Furthermore, the two first electrodes 114 can be electrically connected with the output circuit via two electrodes wires (not shown).

In use of the thermal-chromatic element 100, the colorful thermal-chromatic material layer 110 is disposed in the first chamber 120, the upper sheet 1022 is transparent, and the thermal-chromatic element 100 will show the color via the upper sheet 1022. If a voltage is applied to the two first electrodes 114, the first heating element 106 produces Joule heat and heats the thermal-chromatic material layer 110. After a temperature of the thermal-chromatic material layer 110 is higher than the first temperature and thermal-chromatic material layer 110 releases water vapor. The water vapor gets into the second chamber 122 and is absorbed by the absorption layer 112. Then, the color of the thermal-chromatic material layer 110 will disappear. If a voltage is applied to the two second electrodes 116 and the voltage applied to the two first electrodes 114 is turned off, the second heating element 108 produces Joule heat and heats the absorption layer 112. The water absorbed by the absorption layer 112 will become vapor after a temperature of the absorption layer 112 is higher than a second temperature and the vapor transfers into the first chamber 120, and the thermal-chromatic material layer 110 absorbs the water, and becomes colorful again. As such, the thermal-chromatic element 100 can show the color again via the upper sheet 1022. Because the thermal-chromatic material layer 110 with crystal water is colorful, and the thermal-chromatic material layer 110 can show many kinds of color.

Figure 6:
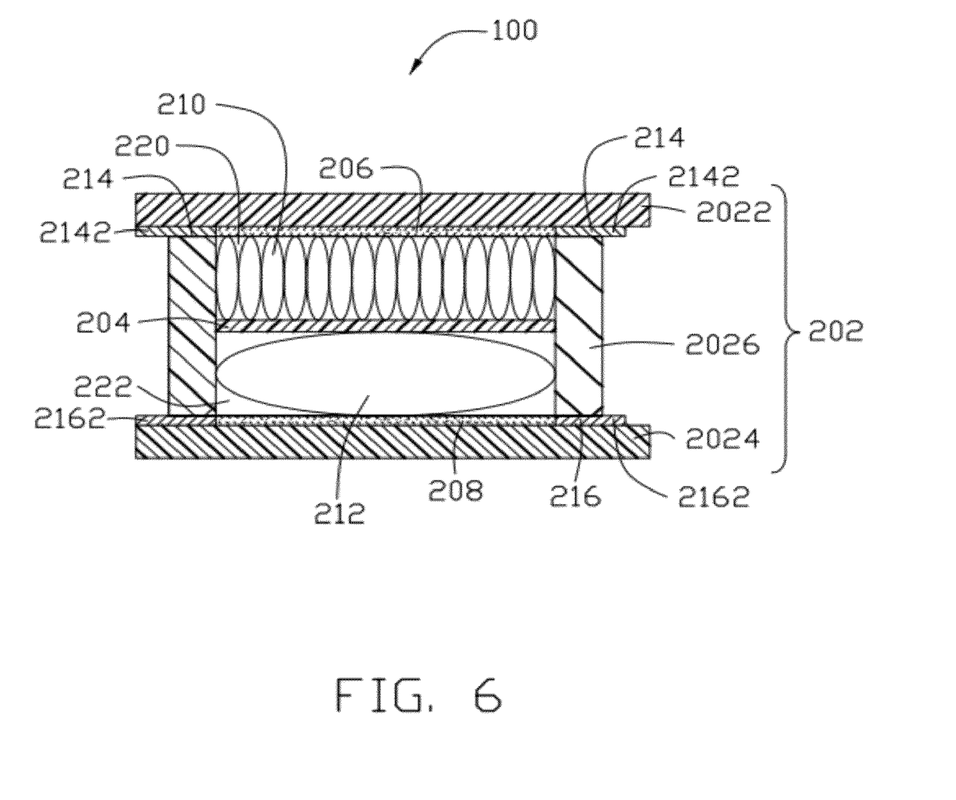
FIG. 6 is a cross-sectional side view of a thermal-chromatic element according to another embodiment.

Referring to FIG. 6, a thermal-chromatic element 200 according to another embodiment is provided. The thermal-chromatic element 200 includes a sealed enclosure 202; an isolation layer 204, a first heating element 206, a second heating element 208, a thermal-chromatic material layer 210, an absorption material layer 212, a first chamber 220 and a second chamber 222. The thermal-chromatic element 200 further includes at least two first electrodes 214 and at least two second electrodes 216. The sealed enclosure 202 includes an upper sheet 2022, a lower sheet 2024, and four side sheets 2026. The upper sheet 2022 includes a first upper surface (not labeled) and a second lower surface (not labeled). The lower sheet 2024 includes a second upper surface (not labeled) and a second lower surface (not labeled).

The first heating element 206 is disposed on the first lower surface of the upper sheet 2022. The second heating element 208 is disposed on the second upper surface of the lower sheet 2024. The first heating element 206 can contact with the thermal-chromatic material layer 210. The second heating element 208 can contact with the absorption layer 212. Each of the first electrodes 214 includes a first extended portion 2142 extending out of the sealed enclosure 202. Each of the second electrodes 216 includes a second extended portion 2162 extending out of the sealed enclosure 202. The first extending portion 2142 can make the first heating element 206 electrically connect with the output circuit easily. The second extending portion 2162 enables the second heating element 208 electrically connect with the output circuit easily.

Other characteristics of the thermal-chromatic element 200 are similar to the thermal-chromatic element 100 disclosed above.

Figure 7:
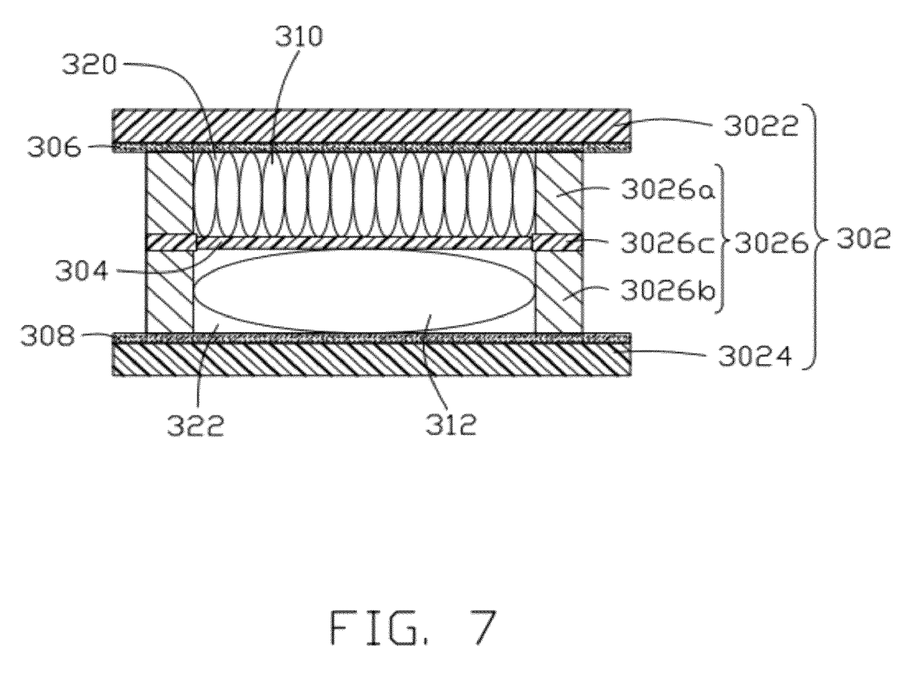
FIG. 7 is a cross-sectional side view of a thermal-chromatic element according to yet another embodiment.

Referring to FIG. 7, a thermal-chromatic element 300 according to another embodiment is provided. The thermal-chromatic element 300 includes a sealed enclosure 302; an isolation layer 304, a first heating element 306, a second heating element 308, a thermal-chromatic material layer 310, an absorption material layer 312, a first chamber 320 and a second chamber 322. The sealed enclosure 302 includes an upper sheet 3022, a lower sheet 3024, two first side sheets 3026 and two second side sheets (not shown). The two first side sheets 3026 are opposite with each other. The two second side sheets are opposite with each other. The two second side sheets are made of insulated material.

Each of the two first side sheets 3026 includes a first conductive portion 3026a, a second conductive portion 3026b, and an insulated layer 3026c. The insulated layer 3026c is disposed between the first conductive portion 3026a and the second conductive portion 3026b. The first conductive portion 3026a and the second conductive portion 3026b are insulated from each other via the insulated layer 3026c. The first conductive portion 3026a is electrically connected with the first heating element 306. The second conductive portion 3026b is electrically connected with the second heating element 308. In one embodiment according to FIG. 7, each of the first conductive portions 3026a is disposed on a surface of the first heating element 306, each of the second conductive portions 3026b is disposed on a surface of the second heating element 308. The first conductive portion 3026a is used as an electrode of the thermal-chromatic element 300 and makes the first heating element 306 electrically connected with the output circuit. The second conductive portion 3026b is used as an electrode of the thermal-chromatic element 300 and makes the second heating element 308 electrically connected with the output circuit.

Other characteristics of the thermal-chromatic element 300 are similar to the thermal-chromatic element 200 disclosed above.

Figure 8:
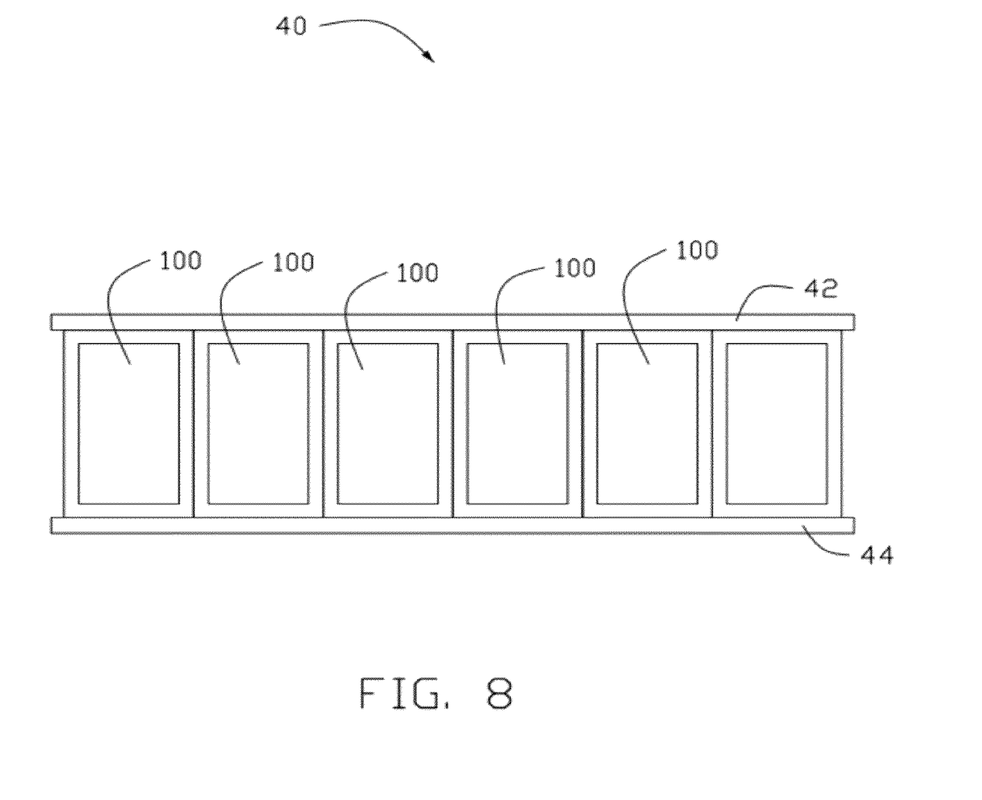
FIG. 8 is a sketch side view of a thermal-chromatic element according to another embodiment.

Referring to FIG. 8, a thermal-chromatic display device 40 according to one embodiment is provided. The thermal-chromatic display device 40 includes a first electrode sheet 42, a second electrode sheet 44 and a plurality of thermal-chromatic elements 100 disposed between the first electrode sheet 42 and the second electrode 44. The structure of the thermal-chromatic element 100 has been discussed above.

Figure 9:
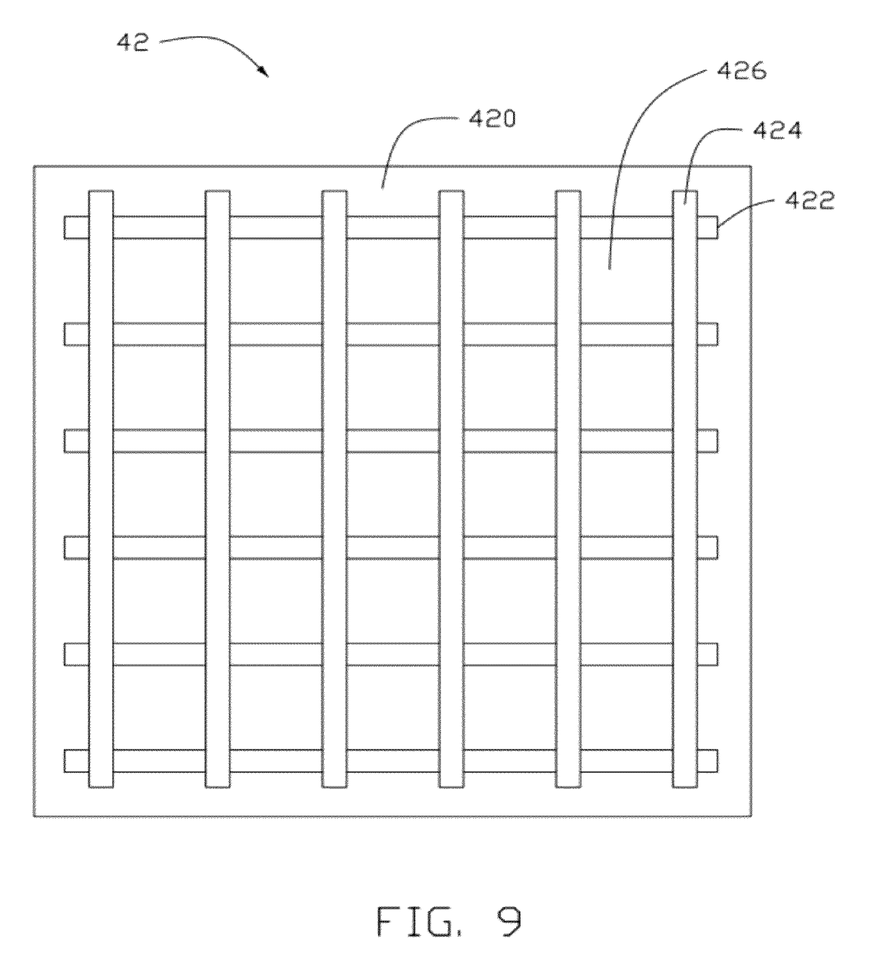
FIG. 9 is a schematic top plan view of a first electrode sheet used in the thermal-chromatic element in FIG. 8.
Figure 10:
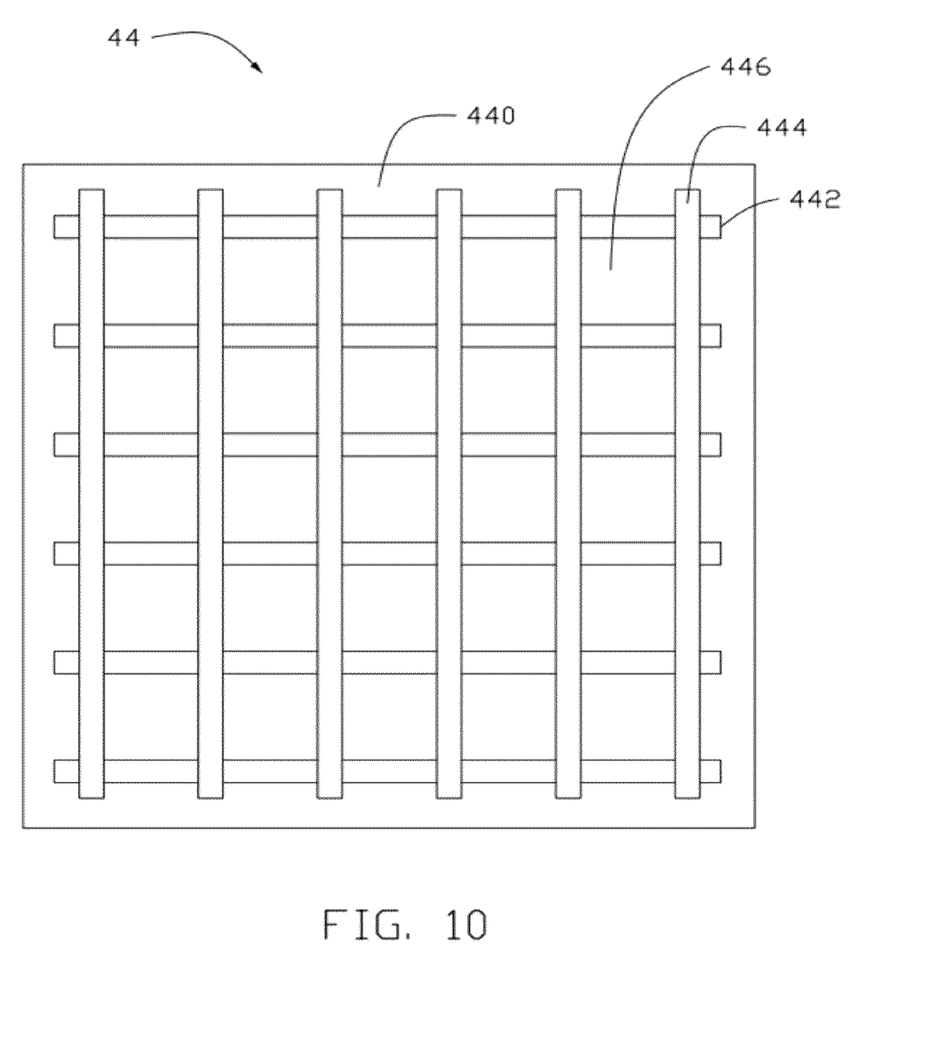
FIG. 10 is a schematic top plan view of a second electrode sheet used in the thermal-chromatic element in FIG. 8.

Referring to FIG. 9, the first electrode sheet 42 is a transparent sheet and includes a first surface 420. The first electrode sheet 42 includes a plurality of first row electrodes 422 and a plurality of first line electrodes 424. The plurality of first row electrodes 422 and the plurality of first line electrodes 424 are disposed on the surface 420. The plurality of first row electrodes 422 and the plurality of first line electrodes 424 are insulated from each other. The plurality of first row electrodes 422 and the plurality of first line electrodes 424 are crossed with each other to form a plurality a first grids including a plurality of first electrode cells 426. Referring to FIG. 10, the second electrode sheet 44 includes a second surface 440, a plurality of second row electrodes 442, a plurality of second line electrodes 444 and a plurality of second electrode cells 446. The structure of the second electrode sheet 44 is the same as the first electrode sheet 42. The second electrode sheet 44 can be transparent or opaque.

The first surface 420 of the first electrode sheet 42 faces the second surface 440 of the second electrode sheet 44. The first electrode cells 426 and the second electrode cells 446 are arranged opposite with each other in a one-to-one manner. Each first electrode cell 426 and each second electrode cell 446 are opposite with each other from a display unit. Each display unit includes one thermal-chromatic element 100. Referring also to FIG. 2, the upper sheet 1022 of each thermal-chromatic element 100 is disposed on the first surface 420 and in one first electrode cell 426, the lower sheet 1024 is disposed on the second surface 440 and in one second electrode cell 446 opposite the first electrode cell 426. The two first electrodes 114 of the thermal-chromatic element 100 are separately electrically connected with the first row electrode 422 and the first line electrode 424 forming the electrode cell 426 in which the thermal-chromatic element 100 disposed. The two second electrodes 116 of the thermal-chromatic element 100 are separately electrically connected with the second row electrode 442 and the second line electrode 444 forming the electrode cell 446 in which the thermal-chromatic element 100 disposed.

The thermal-chromatic display device 40 further includes at least one supporter (not shown) disposed between the first electrode sheet 42 and the second electrode sheet 44. The at least one supporter maintains a distance between the first electrode sheet 42 and the second electrode sheet 44. The at least one supporter can prevent the thermal-chromatic element 100 from being pressed by the first electrode sheet 42 of the second electrode 44.

The thermal-chromatic display device 40 can control each thermal-chromatic element 100 via the first electrode sheet 42 and the second electrode sheet 44 to show color or wipe color. By controlling different thermal-chromatic element 100, the thermal-chromatic display device 40 can show different information or menus.

It is to be understood that the above-described embodiments are intended to illustrate rather than limit the present disclosure. Variations may be made to the embodiments without departing from the spirit of the disclosure as claimed. It is understood that any element of any one embodiment is considered to be disclosed to be incorporated with any other embodiment. The above-described embodiments illustrate the scope of the disclosure but do not restrict the scope of the disclosure.

What claimed is:

1. A thermal-chromatic element comprising:
a sealed enclosure;
an isolation layer disposed in the sealed enclosure and partitioning the sealed enclosure into a first chamber and a second chamber, wherein at least one portion of the first chamber is transparent;
a thermal-chromatic material layer disposed in the first chamber;
a first heating element configured to heat the thermal-chromatic material layer;
an absorption material layer disposed in the second chamber; and
a second heating element configured to heat the absorption material layer.

2. The thermal-chromatic element of claim 1, further comprising at least two first electrodes electrically connected with the first heating element and at least two second electrodes electrically connected with the second heating element.

3. The thermal-chromatic element of claim 1, wherein the sealed enclosure comprises an upper sheet, a lower sheet, and four side sheets; and the isolation layer is suspended in the sealed enclosure and the ridge of the isolation layer is contacting with the four side sheets.

4. The thermal-chromatic element of claim 3, wherein the upper sheet of the sealed enclosure is transparent; the four side sheets comprise upper portions and lower portions, the first chamber is defined by the upper sheet, the isolation layer, and the upper portions of the four side sheets; and the second chamber is defined by the lower sheet, the isolation layer, and the lower portions of the four side sheets.

5. The thermal-chromatic element of claim 4, wherein the upper sheet comprises a first upper surface and a first lower surface, the lower sheet comprises a second upper surface and a second lower surface, the first heating element is transparent and located on the first upper surface or the first lower surface of the upper sheet, and the second heating element is located on the second upper surface or the second lower surface of the lower sheet.

6. The thermal-chromatic element of claim 5, wherein the first lower surface is disposed in the first chamber, the first heating element is disposed on the first lower surface of the upper sheet, and second upper surface is disposed in the second chamber, the second heating element is disposed on the second upper surface of the lower sheet.

7. The thermal-chromatic element of claim 6, wherein the four side sheets comprise two first side sheets opposite to each other and two second side sheets opposite to each other; each of the first side sheets comprises a first conductive portion, a second conductive portion, and an insulated layer disposed between the first conductive portion and the second conductive portion; and the two second side sheets are made of insulated material.

8. The thermal-chromatic element of claim 7, wherein the first conductive portions are electrically connected with the first heating element, and the second conductive portions are electrically connected with the second heating element.

9. The thermal-chromatic element of claim 6, further comprising two first electrodes electrically connected with the first heating element, and two second electrodes electrically connected with the second heating element; each of the first electrodes comprises a first extend portion extending to out of the sealed enclosure, and each of the second electrodes comprises a second extending portion extending to out of the sealed enclosure.

10. The thermal-chromatic element of claim 4, wherein the at least one of the first and second heating elements is an ITO film.

11. The thermal-chromatic element of claim 10, wherein at least one of the first heating element and the second heating element is comprised of a carbon nanotube layer structure, the carbon nanotube layer structure comprises at least one carbon nanotube film comprising a plurality of carbon nanotubes joined with each other via Van der Waals attractive force.

12. The thermal-chromatic element of claim 11, wherein the plurality of carbon nanotubes in the at least one carbon nanotube film are oriented in a same direction, and the plurality of carbon nanotubes form a plurality of carbon nanotube segments joined end-to-end with each other in the direction.

13. The thermal-chromatic element of claim 1, wherein the water released from the thermal-chromatic material layer is able to move between the first chamber and the second chamber in a gaseous state via the isolation layer.

14. The thermal-chromatic element of claim 1, wherein a material of the thermal-chromatic material layer is salt of copper, cobalt or nickel with crystal water.

15. The thermal-chromatic element of claim 1, wherein a material of the absorption layer is selected from the group consisting of acrylic ester polymer, polyvinyl alcohol, vinyl acetate copolymer, polyurethane and polyethylene oxide.

16. The thermal-chromatic element of claim 1, wherein the isolation layer comprises a plurality of micropores and is a cell wall film, a bladder film or a parchment.

17. A thermal-chromatic display device comprising:
a first electrode sheet comprising a plurality of first row electrodes and a plurality of first line electrodes disposed on a surface of the first electrode sheet and crossed with each other to form a plurality of first electrode cells;
a second electrode sheet comprising a plurality of second row electrodes and a plurality of second line electrodes disposed on a surface of the second electrode sheet and crossed with each other to form a plurality of second electrode cells; the first electrode cells and the second electrode cells correspond with each other in a one-to-one manner to from a plurality of display unit;
a plurality of thermal-chromatic elements disposed between the first electrode sheet and the second electrode such that each thermal-chromatic element is disposed in one display unit and comprises:
a sealed enclosure;
an isolation layer disposed in the sealed enclosure and separating the sealed enclosure into a first chamber and a second chamber, at least one portion of the first chamber is transparent; and
a first heating element configured to heat the first chamber;
a thermal-chromatic material layer disposed in the first chamber;
a second heating element configured to heat the second chamber; and
an absorption material layer disposed in the second chamber;
wherein the first heating element of each thermal-chromatic element is electrically connected with one first row electrode and one first line electrode, the second heating element is electrically connected with one second row electrode and one second line electrode.

18. The thermal-chromatic display device of claim 17, wherein the thermal-chromatic element further comprises two first electrodes disposed on a surface of the first heating element and two second electrode disposed on a surface of the second heating element, the two first electrodes are separately electrically connected with the first row electrode and the first line electrode in the display unit, the two second electrodes are separately electrically connected with the second row electrode and the second line electrode in the unit.

19. The thermal-chromatic element of claim 17, wherein the sealed enclosure comprises an upper sheet and a lower sheer, the upper sheet is transparent, the upper sheet is disposed in one first electrode cell, the lower sheet is disposed in one second electrode cell opposite to the first electrode cell.

20. The thermal-chromatic display device of claim 17, further comprising at least one supporter disposed between the first electrode sheet and the second electrode sheet.

* * * * *